United States Patent [19]

Kunen

[11] 4,079,942
[45] Mar. 21, 1978

[54] METHOD OF AND APPARATUS FOR CONTROLLING TURNTABLE SPEED

[75] Inventor: Scott M. Kunen, Freeport, N.Y.

[73] Assignee: Edward A. Jazlowiecki, Forestville, Conn. ; a part interest

[21] Appl. No.: 749,329

[22] Filed: Dec. 10, 1976

Related U.S. Application Data

[63] Continuation-in-part of Ser. No. 612,471, Sep. 11, 1975, abandoned.

[51] Int. Cl.² .............................................. G11B 19/24
[52] U.S. Cl. .................................. 274/1 F; 274/39 A; 318/313
[58] Field of Search ..................... 274/39 A, 1 E, 1 F; 318/313, 480

[56] References Cited

U.S. PATENT DOCUMENTS

| | | | |
|---|---|---|---|
| 3,105,692 | 10/1963 | Berggren | 274/39 A |
| 3,514,685 | 5/1970 | Burgess | 318/313 |

*Primary Examiner*—Steven L. Stephan

[57] ABSTRACT

The linear speed of a disc on a turntable with respect to the stylus of a pick-up device is maintained constant regardless of the radial position of the stylus. The speed control is accomplished through the use of a sensor mounted on a low-mass rod which is connected to and pivots about the same vertical axis as the stylus arm. The sensor is located below the turntable and provides pulses commensurate with radiation received from a timing disc on the underside of the turntable. The sensor produced pulses are delivered to electronic circuitry which continuously measures the linear speed of the timing disc, compares the measured speed to a reference standard, and adjusts the turntable electronically to keep the linear speed constant.

13 Claims, 8 Drawing Figures

METHOD OF AND APPARATUS FOR CONTROLLING TURNTABLE SPEED

CROSS-REFERENCE TO RELATED APPLICATION

This application is a continuation-in-part of Application Ser. No. 612,471 filed Sept. 11, 1975 now abandoned.

BACKGROUND OF THE INVENTION (1) Field of the Invention

The present invention relates to maintenance of a constant linear relative speed between a disc on a turntable and the stylus of a pick-up device which is in contact with the surface of such disc. More specifically, this invention is directed to control apparatus for maintaining the linear speed of a turntable relative to radially movable member constant. Accordingly, the general objects of the present invention are to provide novel and improved methods and apparatus of such character.

(2) Description of the Prior Art

A conventional phonograph disc recording is produced on a recording lathe rotating at a constant angular rate while a cutting head is moved radially along a horizontal overhead track. The number of grooves per inch to be inscribed upon the record surface is dependent upon the speed with which the cutting head is moving toward the center of the record. This speed is not constant because the groove spacing must vary according to the peak to peak amplitude of the signal to be cut on the record, which is adjusted automatically on contemporary recording lathes, and to provide lead-in and lead-out grooves and intersectional spaces between the various selections on a side of the record. Thus, the groove as inscribed upon the recording surface will take the form of an extremely irregular spiral about the center point of the record from a radius of about 5.75 inches to 2.00 inches on a conventional 12 inch diameter record with a standard 4 inch diameter label.

The linear speed of the record, i.e., the rate of travel of the recording surface beneath the recording or reproducing stylus; as the record rotates at constant angular speed will vary in proportion to the instantaneous radial position of the stylus. As the stylus follows the groove spiral inward, the linear speed will vary by a factor of 2.88, which is the outermost radius (5.75) divided by the innermost radius (2.00). Table I gives the actual linear speed at various radii of a conventional 33.33 R.P.M. long-playing record.

TABLE I

| Radius (inches) | Linear Speed (inches/second) |
|---|---|
| 5.75 | 20.00 |
| 5.00 | 17.40 |
| 4.87 | 17.00 |
| 4.00 | 14.00 |
| 3.00 | 10.50 |
| 2.50 | 8.70 |
| 2.00 | 6.96 |

The linear speed of the record determines the highest usable frequency that can be recorded. This maximum frequency occurs when the wavelength of the signal inscribed on the record (wavelength in this case being the linear speed in inches per second divided by the frequency of the modulating signal in cycles per second) becomes comparable to the dimensions of the cutting or reproducing stylus. This can be influenced by the stylus shape, stylus contact area, groove shape, hardness and elasticity of the record surface, etc. Using a contemporary standard commercial long-playing record as a basis, it is empirically true that a linear speed of approximately 17 inches per second is the minimum linear speed necessary to insure flat frequency response to 20,000 cycles per second. Referring to TABLE I, it is seen that a linear speed of 17.00 inches per second occurs at a radius of 4.87 inches on a standard 33.33 R.P.M. record. Between this radius and the outer edge of the record the linear speed is higher—of no great detriment to response, but detrimental to the record surface in that excessive wear results. Below this radius the linear speed will decrease continuously to a minimum of 8.70 inches per second at a radius of 2.50 inches, which is about as close to the center of the record as is practical on conventional records. The decrease of sound quality and increase in distortion on the inner grooves of a record due to the lack of high frequency resolution is readily apparent upon playback with reasonably sophisticated equipment. It is this factor which prevents the phonograph disc as it currently exists from being a satisfactory recording medium wherein optimum sound quality is required.

To correct this intrinsic defect, the linear speed must be held constant at 17.00 inches per second. Although a linear speed lower than 17.00 inches per second would suffice for less critical applications, it is the intent and objective of this disclosure to extend the limits of recorded sound quality far beyond those of currently available commercially produced recordings. The above mentioned speed of 17.00 inches per second is a reasonable compromise between acceptable frequency response and sufficient playing time per side of the disc.

There has been to the present date no acceptable technique or apparatus for maintaining a record disc in a constant linear speed in relation to the stylus of the turntable of a playback apparatus. The achievement of such control will necessarily be implemented with electronic hardware since mechanical means would be inefficient, complicated and highly inaccurate. In addition, the apparatus and technique would have to be compatible with currently existing disc recordings, otherwise conventional recordings could not be played on a constant linear speed turntable.

Thus a requirement of a constant linear speed turntable is that it must be compatible with conventional techniques and apparatus. It must be able to reproduce conventional recordings at speeds of 78, 45, and 33.33 R.P.M. and it must be quickly and easily converted from constant R.P.M. (constant angular) mode to constant linear speed mode and vice-versa. The same electronic mechanism must be used to control both modes.

Another design requirement is that the constant linear speed turntable maintain a rumble level, i.e., the mechanical noise generated by turntable rotation; which is as low or lower than that currently existing in conventional turntables. In order to maintain low rumble, wow and flutter levels, moving parts in the turntable mechanism should be kept to a minimum.

Another design requirement is to provide a constant linear speed control mechanism which will be compatible with all tonearm configurations, including:

(1) standard pivoted arm;
(2) pivoted arm with articulated (pantographic) pick-up head; and
(3) straight-line radial tracking arm.

The constant linear speed control mechanism should cause no mechanical drag whatsoever on the tonearm, nor should it increase the moving mass of the tonearm.

A linear speed control mechanism should also be equally adaptable to a recording turntable as well as reproducing turntable.

A linear speed control technique, to be commercially acceptable, should additionally be independent of the rate of motion of the tonearm due to the inward spiraling of the record groove, as the groove spiral is irregular, and should also be independent of the position of the tonearm with respect to the disc. The linear speed correction must be fact enough that, should the tonearm be manually picked up and moved from one position to another on the disc, the necessary speed correction will take place before the stylus again touches the disc surface. The linear speed must be variable by several percent around the nominal value so that the speed can be accurately adjusted by the user by means of a stroboscope or a special closed-groove test record.

SUMMARY OF THE INVENTION

The present invention meets the above-stated requirements and, in so doing, overcomes the deficiencies and disadvantages of the prior art. In accordance with a preferred embodiment, a servo-controlled constant linear speed turntable is provided with a phototransistor mounted on a low-mass rod which, while attached to the tonearm, travels in a horizontal plane about one-sixteenth inch beneath the turntable platter and directly beneath the stylus. A timing disc is attached to the lower surface of the turntable platter. The timing disc, which may be comprised of any suitable material, is typically 12 inches in diameter and approximately one-sixty fourth inch in thickness. In the case of an aluminum timing disc, the disc is coated with a black oxide which renders it almost totally non-reflective to visible light. Strips of chromium-plated adhesive backed tape one-eighth inch in width are placed radially at 15° intervals on the lower surface of the timing disc. The chromium-plated strips are almost perfectly light reflecting, and a light source incorporated under the timing disc will focus on the timing disc in such a manner that light will strike the chromium-plated strips and reflect onto the phototransistor at the end of the low-mass rod.

The phototransistor is connected to an electronic circuit which measures the linear speed as the timing disc rotates about its vertical axis. The circuit then compares the linear speed with a set reference standard (taken to be 17.00 inches per second in this case) and adjusts the linear speed accordingly by generating a control signal which is delivered to a direct current operated motor employed to rotate the platter and attached timing disc about their coincident vertical axes.

The electronic circuitry, in accordance with one embodiment of the invention, can also operate in a constant angular speed mode. Accordingly, the present invention is compatible with conventional discs (phonograph records) in 78, 45 and 33.33 R.P.M. editions. The electronic means of controlling the linear speed eliminates any rumble, wow or flutter which mechanical means of control would introduce, and does not introduce any drag on the tonearm.

The technique of maintaining constant linear speed remains the same for a recording turntable as well as a play-back turntable. The present invention is also usable on any and all conventional tonearm configurations since the invention is independent of the position of the tonearm with respect to the disc and also is independent of the rate of motion of the tonearm. This invention is also characterized by fast response to speed change commands since the direct current motor employed has relatively high torque at low speed and will quickly accelerate or decelerate at the appropriate control signal.

BRIEF DESCRIPTION OF THE DRAWINGS

The present invention may be better understood and its numerous objects and advantages will become apparent to those skilled in the art by reference to the accompanying drawing wherein like reference numerals refer to like elements in the several figures and in which.

DESCRIPTION OF THE PREFERRED EMBODIMENTS

Figure 3:
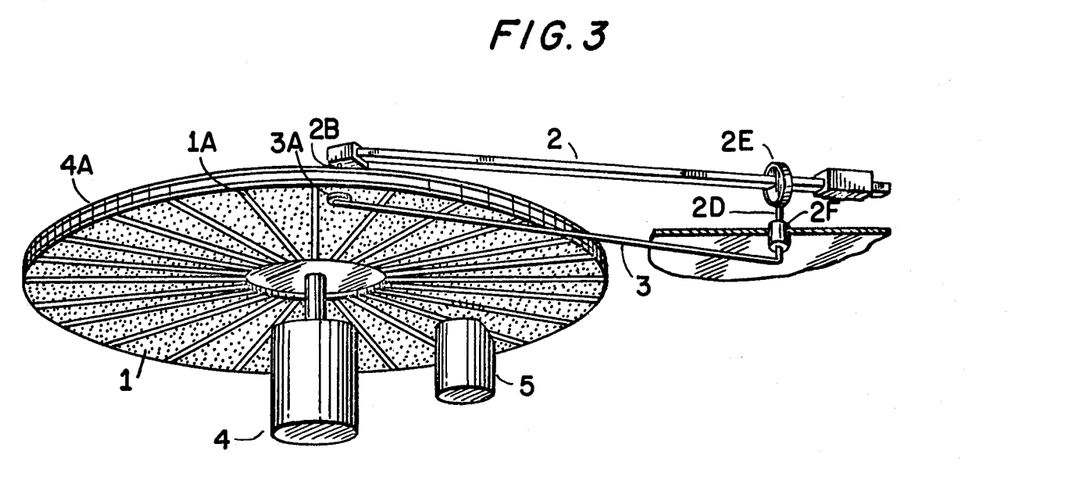
FIG. 3 is a schematic perspective view of the mechanical elements of a preferred embodiment of the invention employed on a turntable having a conventional pivoted tonearm.
Figure 4:
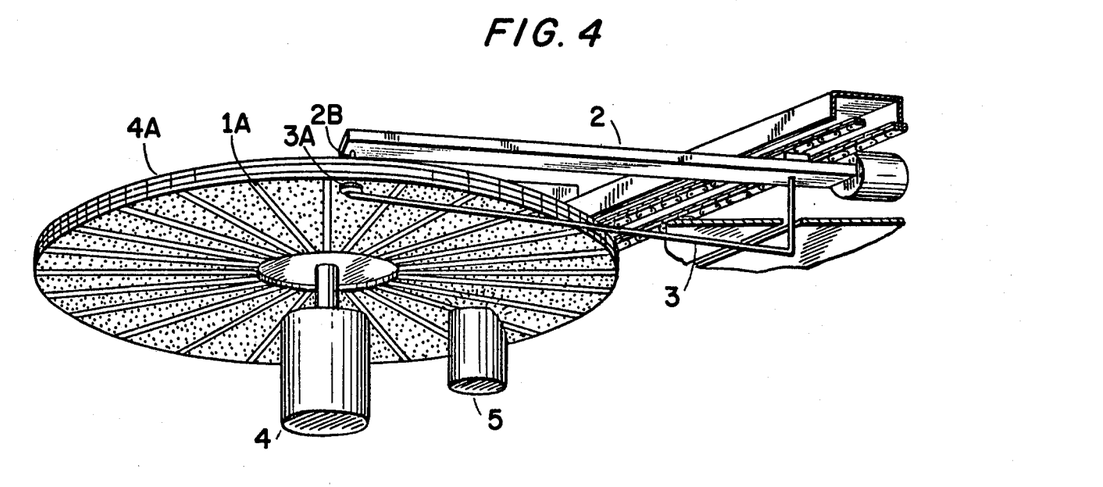
FIG. 4 depicts the embodiment of FIG. 3 incorporated on a turntable with a radial straight-line tracking tonearm.

Turning now in detail to FIGS. 1–4 of the appended drawings, a servo-controlled constant linear speed turntable in accordance with the present invention is shown. The turntable is equipped with a tonearm shown in FIGS. 3 and 4, with its pickup stylus in playback position. The tonearm of FIG. 3 is mounted on a pivot rod supported by a bearing which allows lateral motion, and a gimbal which allows vertical motion. On the opposite end of the pivot rod, below the turntable baseboard, is affixed a tonearm follower rod 3 being in the same vertical plane as the tonearm. The tonearm follower rod is preferably constructed of a thin, light, aluminum or plastic tube. A phototransistor is positioned on the tonearm follower rod so that it is in the vertical projection of the stylus, but on the underside of the turntable. Since the tonearm and the tonearm follower rod are co-pivotal, the phototransistor 3A will always be directly below the stylus as the tonearm and following rod move together parallel to the record surface. The phototransistor 3A always maintains a fixed distance from the underside of the turntable regardless of vertical motion of the tonearm due to any warpage of records.

Figure 1:
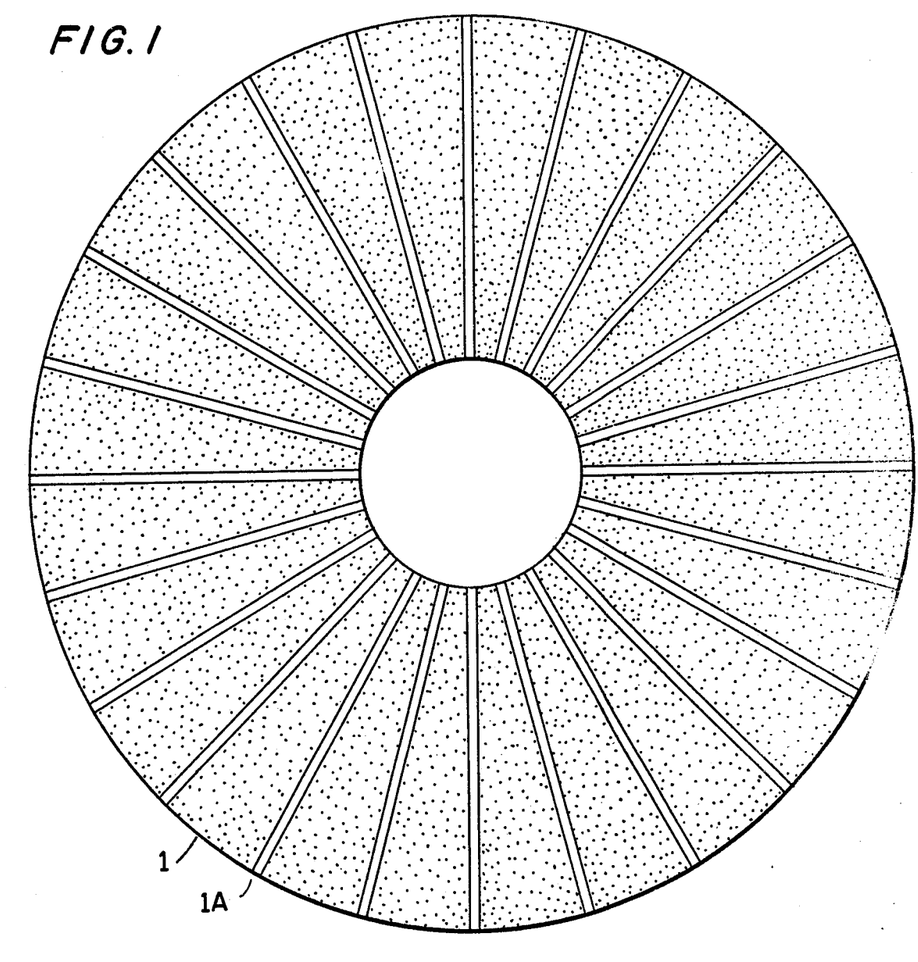
FIG. 1 is a top plan view of a timing disc in accordance with a preferred embodiment of the invention.
Figure 2:
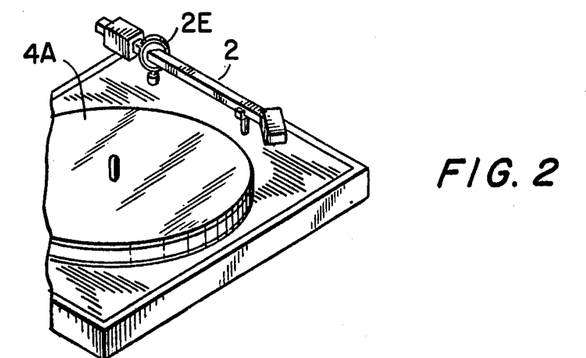
FIG. 2 is a partial perspective view of a turntable, platter and tonearm with which the present invention may be employed.

A timing disc 1 is located on the underside of the turntable facing the phototransistor. The timing disc in accordance with one embodiment, was comprised of aluminum and was 12 inches in diameter and approximately one-sixty fourth inch thick. When an aluminum timing disc is employed, it is coated with a black oxide which renders it almost completely non-reflective for visible light. An oxide coated aluminum timing disc was provided with chromium-plated strips 1A which are almost perfectly light reflecting. A light source 5, timing disc 1, and phototransistor 3A are situated in such a way that light emitted from source 5 will reflect off the timing disc strips 1A onto the photosensitive surface of the phototransistor 3A. Thus, as the timing disc 1 rotates, light from the light source 5 will be reflected from the strips 1A and impinge upon the photosensitive surface of the phototransistor 3A during the entire time a reflective strip 1A is passing over the phototransistor. When an area between two of the strips is passing over the phototransistor, the phototransistor will not be illuminated.

The photosensitive surface of the phototransistor 3A must be very small or the phototransistor must be fitted with a pinhole aperture in order that the width of the phototransistor will not affect the measurement of the time necessary for an energy source, i.e., a strip 1A, to pass overhead. The linear speed under the stylus must be directly measured by some means; it is the function of the timing disc and phototransistor combination to do exactly this. The phototransistor, along with associated circuitry, provides an electronic representation of the time it takes for one chrome strip to pass over a fixed point, i.e., the top of the phototransistor, because the electrical voltage output of a phototransistor is proportional to the light falling upon its photosensitive surface. Since the width of each strip 1A is known, and typically the time it takes for a strip to pass over a fixed point can be measured electronically, the linear speed at that point can be derived. Furthermore, since there are typically twenty-four strips on the timing disc surface, the linear speed is remeasured twenty-four times per rotation of the disc, allowing very close control of the linear speed.

To maintain the linear speed at a constant value, it is necessary to have a reference standard for comparison. A highly accurate electronic clock is employed to generate an electronic representation of the desired linear speed (in this case, 17.00 inches per second). Each time a strip 1A passes over the phototransistor, the measured linear speed is compared with the reference standard. Any deviation from the standard will cause generation of a control signal which will vary the rotational speed of the turntable drive motor in such a way as to bring the linear speed back into synchronization with the standard. By providing a fine adjustment feature to the electronic reference standard, the linear speed can be adjusted about its nominal value so that the user can calibrate the turntable linear speed against an external reference standard (stroboscope or special test record). By allowing the electronic reference standard to assume two or more basic values, two or more choices of linear speed can be made available, much as a standard turntable often provides several choices of angular speed. Both fine and coarse control of linear speed can be implemented by purely electronic means by varying the circuit parameters of the electronic reference standard.

The turntable must also be able to play standard constant R.P.M. records of 33.33, 45, and 78.26 R.P.M. It is necessary as a practical matter for new and improved audio equipment to be downward compatible to previous recording techniques, much as monophonic recordings can be played on stereo equipment, and mono and stereo recordings can be played on four channel equipment. To use the above described timing disc and phototransistor combination to control angular speed, only a simple switch selected change of electronic circuitry is necessary. The phototransistor and associated circuitry will count the number of strips 1A which pass a given point per unit time, rather than measuring the time it takes for one strip to pass a given point. The number of strips passing over a given point per second is proportional to the angular speed of the turntable. An electronic reference standard is employed to generate an electronic representation of the desired constant angular speed. The associated circuitry will generate a control signal to correct the angular speed of the turntable when it deviates from the standard. Again, the electronic reference standard will be slightly variable around the nominal speed so that the turntable R.P.M. can be adjusted with greater precision in the field by using a standard stroboscope disc with a suitable light source.

The mechanical noise generated by the turntable must be held to an absolute minimum, since mechanical vibration will be converted into an equivalent electrical signal by the phonograph pickup exactly as the information recorded on the phonograph disc will be. The best method of reducing noise and eliminating minor speed variations (called wow and flutter) is to have the turntable drive motor running at a low speed and having a minimum number of mechanical devices (drive wheels, idler wheels, gears, and belts) in the drive system. A DC motor is required since its characteristic high torque at low rotational speeds enables it to be directly coupled to the turntable without using any speed reducing interface. Since the motor and turntable platter rotate as a unit, there is actually only one moving part in the turntable drive system. This method has produced excellent results in audio practice, provided proper care is expended in the design and construction of the motor.

Figure 5:
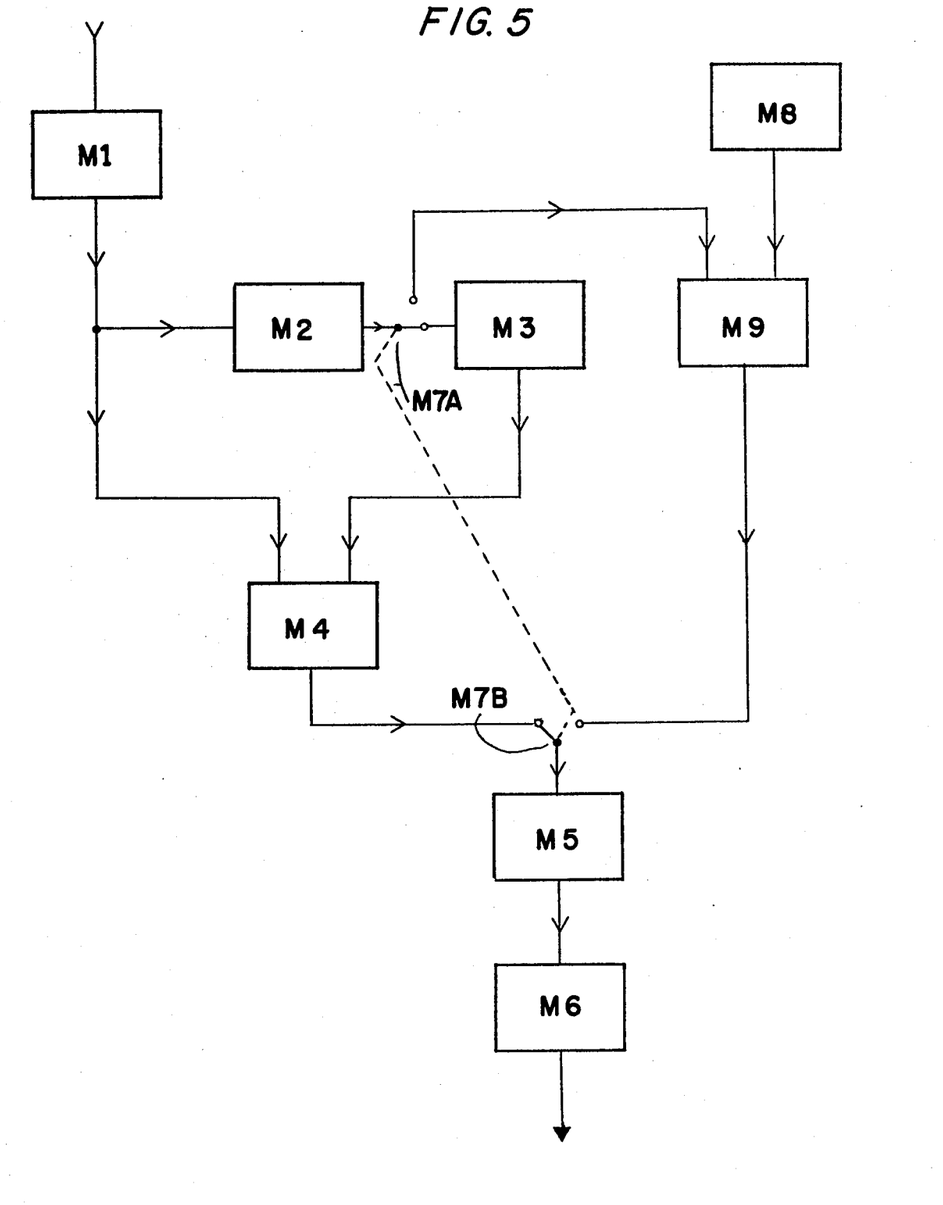
FIG. 5 is a block diagram of the electronic timing and control circuits of the embodiment of FIG. 3.
Figure 6:
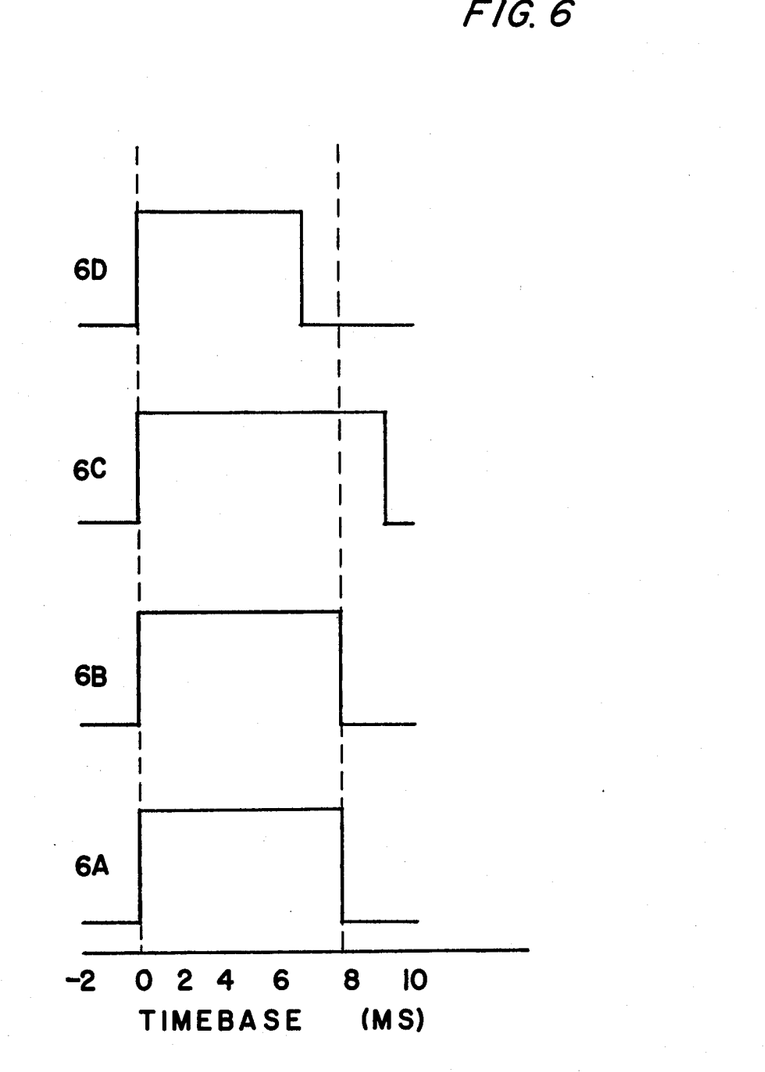
FIG. 6 represents the electrical waveforms present at certain points in the timing and control circuitry of FIG. 5.

Returning now jointly to FIGS. 5 and 6, the electronic control in accordance with a preferred embodiment of the invention will be described. A pulse shaping circuit M1 converts the output signals of phototransistor 3A into a corresponding square wave as shown in FIG. 6, waveform 6B. The square wave output of pulse shaper M1 is delivered to a further pulse shaper M2 which transforms the leading edge of the square wave output of M1 into a spiked waveform suitable for triggering a monostable multivibrator M3.

When triggered by the output pulse of M2, multivibrator M3 delivers a square output pulse of a precise duration of 7.353 milliseconds as shown in FIG. 6, waveform 6A. The output of multivibrator M3 and the output of pulse shaper M1 are compared in a pulse width comparator circuit M4. Comparator M4 thus accepts two synchronized square wave pulse trains as inputs, and provides a DC voltage output proportional to the difference in pulse duration between the pulse of those two pulse trains.

In the constant linear speed mode of operation the output voltage from comparator M4 is applied to an integrator M5. Integrator M5, in turn, is applied as the input to DC amplifier M5 whose output is directly coupled to the turntable drive motor, not shown.

To convert the turntable from the constant linear speed mode, as shown, to constant angular speed mode, ganged single pole double throw switches M7A and M7B are employed. When in the constant angular speed position, switch M7A connects the output of pulse shaper M2 to a pulse rate comparator M9. Comparator M9 also receives the output of a constant pulse rate generator M8. Comparator M9 thus accepts two spiked wave pulse trains as inputs, and provides a DC voltage output proportional to the difference in pulse repetition rate between the two pulse trains. Switch M7B, when in the constant angular speed position, delivers the output of comparator M9 to the input of integrator M5.

The timing and control of the turntable drive system shall be described in terms of function rather than the detailed circuitry required since the various circuit comparators are commercially available and known to those skilled in the art. Pulse shaper M1 acts upon the output of the phototransistor 3A. In operation, the phototransistor will be illuminated during the time a strip 1A is passing over it and unilluminated between strips. Thus the electrical output of the phototransistor will alternate between two discrete values. Pulse shaper M1 will convert the output of the phototransistor into a near perfect square wave with vertical leading and trailing edges and a horizontal top as shown in FIG. 6, waveform 6B. It is an important aspect of circuit operation that the pulse width of the square wave thus obtained is equal to the time necessary for one strip to pass a fixed point, which is of course proportional to the linear speed at that point. Since a linear speed of 17.00 inches per second shall be maintained, and each strip is one-eighth inch wide, the square wave pulse width will be 7.353 milliseconds when the linear speed is correct, but will deviate from this value when the linear speed is incorrect.

Pulse shaper M2 acts upon the output of pulse shaper M1 to convert, by differentiation, the leading edge of the square wave into a spiked waveform necessary to reliably trigger monostable multivibrator M3.

At this point, note that the mode switch M7A and M7B is shown in constant linear speed mode position. Constant linear speed operation will be discussed first and then constant angular speed operation.

A constant width pulse generator M3 is used to generate the standard against which the actual linear speed is to be compared. The function of generator M3 is to generate a square-edged pulse of absolutely constant duration when triggered. Since generator M3 receives its trigger pulse from pulse shaper M2, which is in turn responsive to the leading edge of the pulse output of pulse shaper M1, it may be seen that the square wave outputs of pulse shaper M1 and pulse generator M3 will be produced with their leading edges coincident. In FIG. 6 waveform 6A represents the output of generator M3, and waveforms 6B, 6C, and 6D represent possible outputs of pulse shaper M1. The duration of the pulse provided by generator M3 must be adjusted to precisely 7.353 milliseconds. The amplitudes of the pulses produced by pulse shaper M1 and generator M3 are equal.

The square pulse generated by pulse shaper M1 and the square pulse generated by generator M3 are applied to pulse width comparator M4. The basic mechanism of linear speed measurement and correction operates as follows: At time 0, represented by the vertical dotted line at the zero point on the timebase, a strip 1A passes over the phototransistor 3A, thus illuminating it. This also initiates the pulse output of shaper M1. It also initiates the pulse output of generator M3 (waveform 6A). Both pulses will rise to their positive values as shown. The pulse output of shaper M1 will remain at this value during the time the strip is passing over the phototransistor. The pulse output of M3 will remain at this positive value for precisely 7.353 milliseconds; 7.353 milliseconds being represented by the rightmost vertical line on the timebase of FIG. 6. At Time 7.353 milliseconds the output of generator M3 will drop to its rest value as shown in waveform 6A. When the strip has passed over the phototransistor the output of shaper M1 will drop to its rest value as shown in waveforms 6B, 6C, and 6D. If the linear speed is correct, the trailing edges of the pulses produced by circuits M1 and M3 will be coincident as shown by waveform 6B. If the linear speed is too slow, the trailing edge of the pulse output of shaper M1 will occur after that of generator M3, as shown by waveform 6C. If the linear speed is too fast the trailing edge of the pulse produced by shaper M1 will precede that of generator M3 as shown by waveform 6D. The magnitude of the deviation from the correct linear speed will be proportional to the difference between the durations of the pulse outputs of circuits M1 and M3. The direction of the deviation (slow or fast) will be given by the time of occurrence of the trailing edge of the pulse from shaper M1 with respect to the trailing edge of the pulse from generator M3. Note that this comparison occurs every time a radiation source, i.e. a strip, passes the sensor, i.e. the phototransistor. As comparator M4 performs each comparison, it produces a pulse whose magnitude and polarity are proportional to the deviation from the proper linear speed at the time of the comparison. There are twenty-four comparisons per revolution of the turntable. Comparator M4 also time averages the comparisons by means of an integrating circuit. The output of comparator M4 thus consists of a continuous voltage whose magnitude is proportional to the deviation from the correct linear speed and whose polarity indicates the direction of the deviation. The polarity chosen in the design of comparator M4 is positive when too slow and negative when too fast. When the linear speed is correct the output of comparator M4 will be zero.

Circuit M5 is used to generate the voltage which will power the DC drive motor via the motor drive amplifier M6. The mathematical function of Circuit M5 is that an integrator and its circuit operation is as follows: When the system is in equilibrium (i.e. the linear speed is correct) the output of comparator M4, which is the control voltage for circuit M5, will be zero. This causes the voltage output of circuit M5 to be constant (zero rate of change). When the linear speed becomes too slow, which will happen because of the normal inward movement of the tonearm as the record is being played, or due to manual inward movement of the tonearm by the user, the voltage output of comparator M4 will assume a positive value of some magnitude as discussed above. This will cause the output of circuit M5 to begin increasing in the positive direction (positive rate of change). This positive going change in output voltage will cause the drive motor to increase its rotational speed continuously until the linear speed is once again correct. When the linear speed is correct, the system is once again in equilibrium, and the motor drive voltage will now level off at this new value. Note that the rate of change of the output voltage of circuit M5 is controlled by the polarity and magnitude of the input voltage. Thus, one will obtain a small rate of change for small linear speed corrections (normal record playing condition) and a great rate of change for large linear speed corrections (manual movement of the tonearm or fast intersectional groove spiraling). A high acceleration of the drive motor can be obtained to quickly bring the linear speed back into line after manual movement of the tonearm. The linear speed control mechanism is equally effective in accelerating or decelerating the drive motor as necessary to correct the linear speed and, therefore, inward and outward motion of the tonearm will be compensated for equally well.

When constant angular speed operation is desired in order to play standard constant R.P.M. records, the ganged mode switch need only be placed in constant angular speed position. The system will now control the angular speed. It will be clear from the preceding discussion that pulse shaper M2 will produce an output spike every time a strip crosses the phototransistor. Thus the number of pulses per second is proportional to the angular speed. Oscillator M8 produces spiked pulses similar to those produced by pulse shaper M2 at an accurately controlled pulse repetition rate (in practice there will be several pulse repetition rates corresponding to turntable speed of 33.33, 45, and 78.26 R.P.M.). The pulse rate comparator M9 has two inputs, i.e., the pulses generated by shaper M2, which correspond to the true rotational speed of the turntable, and the pulses generated by standard oscillator M8, which correspond to the rotational speed which must be maintained. As in linear speed operation, there are three possibilities. The angular speed may be correct, in which case the pulse rate of the pulses provided by pulse shaper M2 and the pulse rate of oscillator M8 will be equal, and the voltage output of comparator M9, which is the angular speed correction voltage, will be zero. The angular speed may be too low, in which case the output of comparator M9 will be positive. The angular speed may be too high, in which case the voltage output of comparator M9 will be negative. The voltage output of pulse rate comparator M9 will be used as the input to control voltage integrator M5, and from this point on the function of circuit M5 in regulating motor speed proceeds exactly as in the constant linear speed mode of operation.

Figure 7:
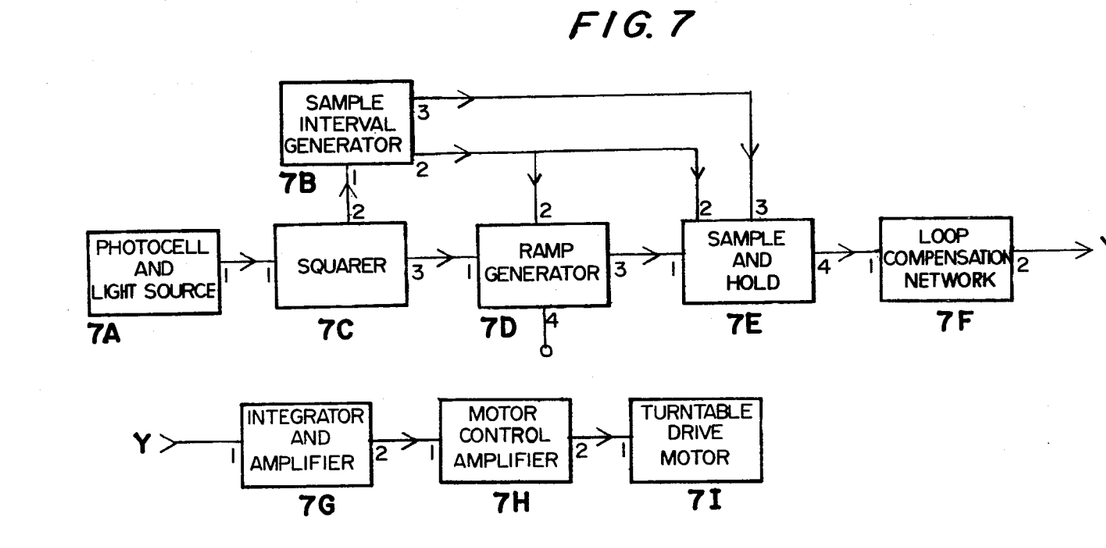
FIG. 7 is a more refined block diagram of the electronic timing and control circuits of the embodiment of FIG. 3.

Referring to FIG. 7, we shall now describe a more sophisticated method which may be used to implement the constant linear speed/constant angular speed servo-mechanism described above.

7A PHOTOCELL AND LIGHT SOURCE

This is an integrated circuit consisting of an infra-red light source, silicon photocell, and an amplifier. This chip is mounted on the rigid tonearm follower rod under the turntable as previously described. Since the light source is contained on the chip itself, a separate external light source is not required.

7B SAMPLE INTERVAL GENERATOR

This integrated circuit is a mono-stable multivibrator which will generate an output pulse at terminal 3 coincident with an input pulse at terminal 1 with a second output pulse 15 microseconds later at terminal 2.

7A SQUARER

This circuit transforms the output of the photocell (which is a rounded waveform) into a precise square pulse with vertical leading and trailing edges and a horizontal top.

7D RAMP GENERATOR

Figure 8:
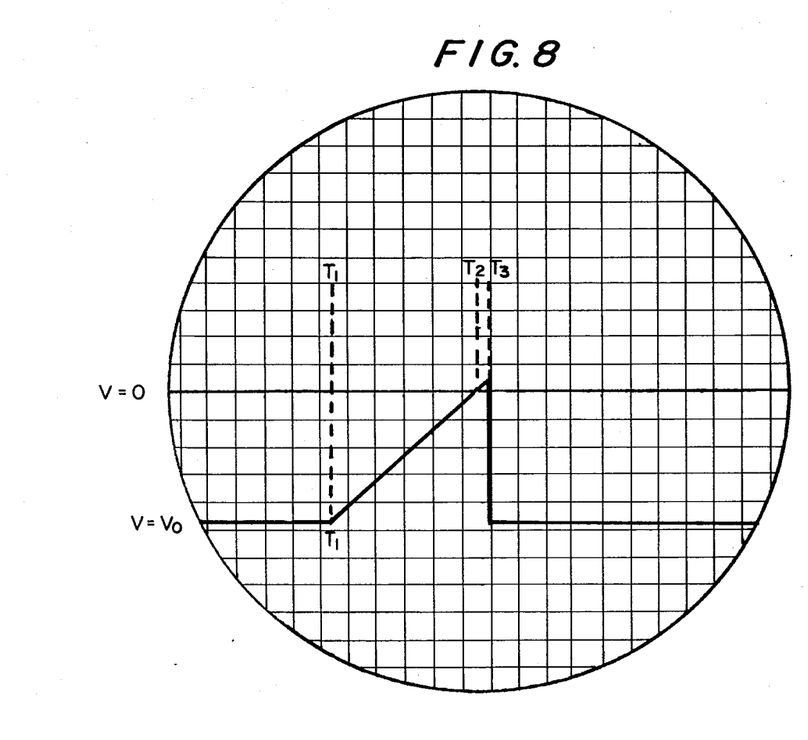
FIG. 8 is a representation of voltage waveforms which will facilitate understanding of the invention.

This circuit produces a linearly rising voltage with respect to time (known as a ramp waveform) at terminal 3 when a trigger pulse appears at terminal 1. This output voltage is illustrated in FIG. 8. Before the trigger pulse is applied, the ramp generator output at terminal 3 is a steady-state DC voltage of magnitude $V_o$. This is known as the Ramp Offset Voltage. This trigger pulse is assumed to be applied at Time $= T_1$. Note that the ramp voltage starts to rise linearly at Time $= T_1$. This linear rise will continue until a second trigger pulse is applied to terminal 2. When this occurs, the ramp will instantaneously discharge and revert to its quiescent value $V_o$ and remain there. This action is shown at Time $= T_3$ in FIG. 8.

7E SAMPLE AND HOLD

When initiated by a trigger pulse at terminal 3, this circuit will store the input voltage present at terminal 1 at that instant in time and make this same voltage continuously available at terminal 4. This output voltage will remain constant until the circuit is requested to again sample the input voltage.

7F LOOP COMPENSATION NETWORK

These circuits provide stability to the operation of the control loop by shaping the transient and phase response of the system. This insures that the system will not oscillate when large transients occur, nor will it hunt when in equilibrium.

7G INTEGRATOR/AMPLIFIER

This circuit provides the majority of the gain necessary for operation of the servo-control loop. The integrator is necessary to smooth out ripples and steps which occur in the control signal and to provide a smoothly varying DC control voltage to be used to regulate the turntable drive motor angular speed.

7H MOTOR CONTROL AMPLIFIER

This is a high current DC amplifier used to power and control the turntable drive motor.

7I TURNTABLE DRIVE MOTOR

When a reflective strip passes over the photocell/light source module (7A), the photocell is illuminated during the entire time the reflective strip is passing overhead. This effect has been described in detail previously in this application. The electrical output of the photocell is acted upon by the Squarer (7C) whose function is to transform the photocell output waveform sharply defined square pulse, as illustrated in FIG. 6, Waveform 6A. Note that the waveform has a sharply defined vertical leading edge and trailing edge.

It is a very important consideration in the operation of this invention that the leading vertical edge of the square pulse output of the Squarer represents the instant in time that the reflective strip first starts to cross the photocell, and we will henceforth call this instant in time $T_1$. Also, the trailing vertical edge represents the point in time that the reflective strip just finishes crossing the photocell, and we will call this instant in time $T_2$. It is clear that the time interval $T_2$ minus $T_1$ represents the time necessary for a reflective strip to pass over a fixed point. Thus, the pulse duration of the Squarer output is an exact electrical analog of the time it takes for the strip to cross a point and is representative of the linear speed at that point. In the most recent embodiment of this invention, there are 72 reflective strips around the circumference of the turntable platter. Thus, the linear speed is measured and corrected 72 times per turntable revolution, allowing for very close control of linear speed.

We shall now describe in detail the sequence of events by which this is accomplished.

At Time=$T_1$, the vertical edge of the Squarer waveform generates a trigger pulse at terminal 3 of the Squarer. This pulse is then applied to terminal 1 of the Ramp Generator (7D) initiating the ramp action. This ramp output voltage is produced at terminal 3 of the Ramp Generator.

At Time=$T_2$, the trailing edge of the Squarer waveform produces an output pulse at terminal 2 of the Squarer. This initiates the action of the Sampling Interval Generator (7B). This is simply a mono-stable multivibrator which produces a two output pulses separated in time by a fixed interval. The first output pulse is coincident with the input trigger pulse and the second pulse occurs 15 microseconds later. These pulses are used to control the Sample and Hold circuit (7E) as follows: At Time=$T_2$, the trailing edge of the Squarer produces a trigger pulse at terminal 2 which is conveyed to terminal 1 of the Sample Interval Generator. At this same instant in time a trigger pulse is produced by the Sample Interval Generator which appears at terminal 3. This pulse is conveyed to terminal 3 of the Sample and Hold circuit which initiates its operation. After an interval of 15 microseconds, a second trigger pulse is generated at terminal 2 of the Sample Interval Generator. This pulse initiates two simultaneous actions: Firstly, it terminates the sampling period of the Sample and Hold circuit; Secondly, it discharges the Ramp Generator which immediately reverts to its quiescent voltage $V_o$. During the sampling interval, i.e., the 15 microseconds between Time=$T_2$ and Time=$T_3$ (see FIG. 8), the Sample and Hold circuit will measure and retain the voltage appearing at terminal 1 and will make this voltage continuously available at terminal 4 until the next sampling interval. It should be noted that the 15 microsecond interval between Time=$T_2$ and Time=$T_3$ is extremely short when compared to the approximately 3 millisecond interval between Time=$T_1$ and Time=$T_2$. The interval is shown greatly exaggerated in FIG. 8 for reasons of visibility. For all practical purposes, we may consider the sampling period to be a negligible interval occuring exactly at Time=$T_2$. The 15 microsecond sampling interval is just enough time to allow the Sample and Hold circuit to respond. What we have really done, therefore, is to store the output voltage the Ramp Generator has attained at Time=$T_2$.

The voltage that the Ramp Generator attains at Time=$T_2$ correlates with the linear speed of the turntable in the following fashion: We see that the ramp voltage rises linearly from its quiescent state, $V_o$, at Time=$T_1$, to some higher value at Time=$T_2$. Let us assume that the voltage of the Ramp Generator at Time=$T_2$ will represent the deviation from the desired linear speed. If, (as is shown in FIG. 8) the ramp voltage crosses the zero axis precisely Time=$T_2$, a sample of the ramp voltage taken at Time=$T_2$ would show a voltage of zero, and this indicates zero deviation from the desired linear speed. (Recall here that Time=$T_2$ is physically the instant when the reflective strip has just passed over the photocell). Let us examine the case where the linear speed is too fast. In this instance, Time=$T_2$ would occur before the ramp voltage has crossed the zero axis, and the sampled voltage would be positive. In summary, we are using the rising ramp voltage to keep track of the time it takes for the reflective strip to cross the photocell. When the linear speed is correct, the ramp will have just enough time to rise from the negative ramp offset voltage ($V_o$) to a value of zero. When the linear speed deviates from the proper value, the ramp voltage sampled at Time=$T_2$ will be either positive or negative depending on the direction of deviation.

Thus, at the output of the Sample and Hold Circuit (terminal 4) we have a stepwise voltage whose magnitude represents the correction which must be applied to the Drive Motor to keep the linear speed constant. Note that by manually adjusting the ramp offset voltage $V_o$, we can change the linear speed that will produce zero error signal at Time=$T_2$. Terminal 4 on the Ramp Generator is the input used for this purpose. This is the method by which various linear speeds can be selected and/or slight adjustments to the linear speed can be made.

The Loop Compensation Network (7F) is necessary to insure stability of the servo loop under all conditions. The phase response and gain must be carefully controlled at all frequencies that will be encountered. This type of compensation is necessary in any servo mechanism, and serves no further logical function in regard to this invention.

The Integrator Amplifier (7G) is an important logical control block and will be discussed in detail. The function of the integrator, mathematically as well as electronically, is to provide at its output the time averaged sum of its one or more inputs. Concomitantly, an integrator will also transform a stepwise varying input function into a smoothly varying output function. It is the output voltage of the Integrator/Amplifier at terminal 2, which, via the Motor Control Amplifier (7H), controls the speed of the Turntable Drive Motor (7I). An important corollary of integrator action is that the integrator output voltage will remain constant for an infinite time until the input signal causes it to change. Thus, the integrator will hold the speed of the turntable drive motor constant until an error signal is detected. The error signal will, in effect, adjust the integrator output voltage up or down until the error is corrected, at which time the error signal will become zero. We can see that the presence of the integrator element exerts a great stabilizing influence on the rotational speed of the turntable drive motor, which, as we have discussed previously is a very important consideration in turntable design. The effect of the integrator is augmented by the rotating mass of the turntable to further smooth out ripples in angular speed.

In a normal record playing situation, the stylus will slowly move from the outer edge of the record toward the inside. The angular speed of the turntable must gradually increase to keep the linear speed constant. This means that a very small error signal will be almost constantly present, and will keep adjusting the integrator gradually upward. When the tonearm is manually picked up and moved, a very large error signal will be instantly generated. The servo circuit is so designed that when a large scale error is detected, the motor control amplifier will apply the maximum rated current through the turntable drive motor in such a direction as to null out the error. Thus, the maximum torque of the motor is available to quickly correct the angular speed of the turntable when the tonearm is moved manually across the record. Note that when the tonearm is moved from the inside to the outside of the record, the angular speed of the turntable must decrease. The control circuits will then reverse the polarity of the motor drive voltage so as to provide an electric braking effect on the turntable. The turntable control circuits can equally well increase or decrease the turntable angular speed with equal rapidity.

It has been stated in the objectives of this invention that the turntable must also be able to play standard constant angular speed records. The servo mechanism must therefore be able to maintain constant angular speed as well as constant linear speed. The operation of the invention so as to maintain constant angular speed will now be described.

Instead of fixing our attention on the time necessary for a reflective strip to cross a fixed point, we shall use the time interval between the instant the leading edge of a reflective strip crosses the point, and the instant the leading edge of the next strip crosses the point. It is seen that if the servo mechanism is used to maintain this time interval constant, the turntable will be maintained in a constant angular speed condition. This is logically similar to counting the number of strips per second passing over the photocell, using the servo to keep this rate constant. Maintaining the angular speed by measuring the time interval between adjacent strips may be implemented with very little increase in circuit complexity.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. In a turntable drive system, the turntable having a record disc supporting first side and including a variable speed motor and a movable tone arm with a pick-up device at a first free end thereof, the improvement comprising:
    means for generating reference pulses having a duration commensurate with the desired linear speed of the turntable;
    timing means, said timing means being mounted from the second oppositely disposed side of the turntable for rotation coaxially therewith, said timing means including a plurality of generally coplanar equally spaced reflective strips, said reflective strips being of constant width and being oriented radially with respect to the axis of rotation of the turntable;
    rod means mounted beneath said timing means for motion in a plane parallel to the plane of the turntable first surface;
    means coupling said rod means to the tone arm for synchronized movement therewith, said rod means being oriented with a first point thereon located generally in vertical alignment with the pick-up device;
    a sensor mounted on said rod means at said first point, said sensor being responsive to radiation reflected from said timing means reflective strips for generating an electrical signal each time a reflective strip passes said sensor, said generated electrical signals having a duration and repetition rate which are functions of the width of said reflective strips and the rotational speed of said turntable;
    first comparator means for comparing the duration of said reference pulses with the duration of the signals generated by said sensor, said comparing means producing signals commensurate with the difference in duration between said compared signals; and
    means responsive to the difference signals produced by said first comparator means for generating motor control signals of proper polarity to produce a nulling of said difference signals.

2. The apparatus of claim 1 wherein said apparatus further comprises:
    a light source positioned on the same side of the turntable as said timing means for illuminating said timing means reflective strips.

3. The apparatus of claim 1 further comprising:
    means for generating reference pulses at a repetition rate commensurate with a desired turntable angular speed;
    second comparator means for selectively comparing the repetition rate of said pulses commensurate with desired angular speed with the rate of occurrence of the signals generated by said sensor, said second comparator means generating signals commensurate with the difference between the reference pulse repetition rate and the rate of repetition of signals produced by said sensor; and
    means for selectively delivering signals generated by said first and second comparator means to said motor speed control signal generating means to vary the speed of the motor as appropriate to null either a linear or angular turntable speed error.

4. The apparatus of claim 3 wherein said timing means comprises a disc comprised of non-ferromagnetic material, said reflective strips being carried by said disc.

5. The apparatus of claim 1 wherein said timing means, sensor and means for generating motor speed control signals define a servo mechanism with negative feedback.

6. The apparatus of claim 3 wherein said apparatus further comprises:
    a light source positioned on the same side of the turntable as said timing means for illuminating said timing means reflective strips.

7. The apparatus of claim 4 further comprising:
    means for generating reference pulses at a repetition rate commensurate with a desired turntable angular speed;
    second comparator means for selectively comparing the repetition rate of said pulses commensurate with desired angular speed with the rate of occurrence of the signals generated by said sensor, said selective comparing means generating signals commensurate with the difference between the reference pulse repetition rate and the rate of repetition of signals provided by said sensor; and
    means selectively delivering said signals generated by said first and second comparing means to said motor speed control generating means to vary the speed of the motor to achieve either a desired linear or angular turntable speed.

8. A method for controlling a turntable to obtain preselected constant speed between a record disc positioned thereon and a stylus mounted on a movable arm as the stylus moves from the outer diameter of the record disc toward the inner diameter thereof during rotation of the turntable, said method comprising the steps of:
    tracking the position of the stylus with an energy responsive sensor located beneath the turntable;
    causing the turntable to radiate energy toward the pick-up device from a plurality of spatially displaced radially oriented regions of constant width, the sensor thereby producing signals commensurate with the passing of each of said regions as the turntable rotates;
    comparing the signals produced by the sensor with reference signals having a duration corresponding to a desired linear speed to obtain an indication of differences between actual and desired linear speed at the stylus-record disc interface;

selectively comparing the rate of generation of signals by the sensor with a pulse train having a repetition rate commensurate with a desired angular speed to obtain an indication of a variance between the desired and actual angular speeds;

adjusting the speed of the turntable to null out any difference between actual and desired linear speed; and adjusting the speed of the turntable to null out any difference between actual and desired angular speed when the turntable is not being controlled to provide a constant linear speed.

9. The method of claim 6 wherein the step of causing the turntable to radiate includes:

illuminating reflective strips on a timing disc which rotates with the turntable.

10. In a turntable drive system, the turntable having a record disc supporting first side and including a variable speed motor and a movable tone arm with a pick-up device at a first free end thereof, the improvement comprising:

timing means, said timing means being mounted from the second oppositely disposed side of the turntable for rotation coaxially therewith, said timing means including a plurality of generally coplanar equally spaced reflective strips oriented radially with respect to the axis of rotation of the turntable, said reflective strips being of constant width;

rod means mounted beneath said timing means for motion in a plane parallel to the plane of the turntable first surface;

means coupling said rod means to the tone arm for synchronized movement therewith, said rod means being oriented with a first point thereon located generally in vertical alignment with the pick-up device;

a sensor mounted on said rod means at said first point, said sensor being responsive to radiation reflected from said timing means reflective strips and generating an electrical signal each time one of said reflective strips passes said sensor during rotation of the turntable, said sensor generated signals having a duration and repetition rate which are functions of the width of the strips and the rotational speed of the turntable;

means responsive to signals generated by said sensor for producing signals having a duration commensurate with the actual linear speed of the turntable;

means responsive to the initiation of production of each of said signals commensurate with actual linear speed for causing generation of a signal which varies in magnitude linearly with time;

means responsive to the termination of each of said signals having a duration commensurate with actual linear speed for sampling the instantaneous magnitude of said signal which varies linearly with time, the magnitude of said sampled linearly varing signal thus being commensurate with actual turntable linear speed; and means responsive to the magnitude of the sampled signal for adjusting the speed of the turntable drive motor.

11. The apparatus of claim 10 further comprising:

means responsive to the termination of each of said signals having a duration commensurate with actual speed for causing the resetting of said linearly varying signal to a predetermined level a preselected time after the sampling of said signal.

12. The apparatus of claim 10 wherein said apparatus further comprises:

a light source positioned on the same side of the turntable as said sensor for illuminating said timing means reflective strips, said light source being integral with said sensor.

13. The apparatus of claim 12 further comprising:

means responsive to the termination of each of said signals having a duration commensurate with actual speed for causing the resetting of said linearly varying signal to a predetermined level a preselected time after the sampling of said signal.

* * * * *